Dec. 18, 1956     E. A. RICHARDSON     2,774,566
FLUID COOLED PERMEABLE TURBINE BLADE
Filed Dec. 12, 1947     3 Sheets-Sheet 1

Inventor
Edward Adams Richardson
By Busser & Harding
Attorneys

Dec. 18, 1956  E. A. RICHARDSON  2,774,566
FLUID COOLED PERMEABLE TURBINE BLADE
Filed Dec. 12, 1947  3 Sheets-Sheet 2
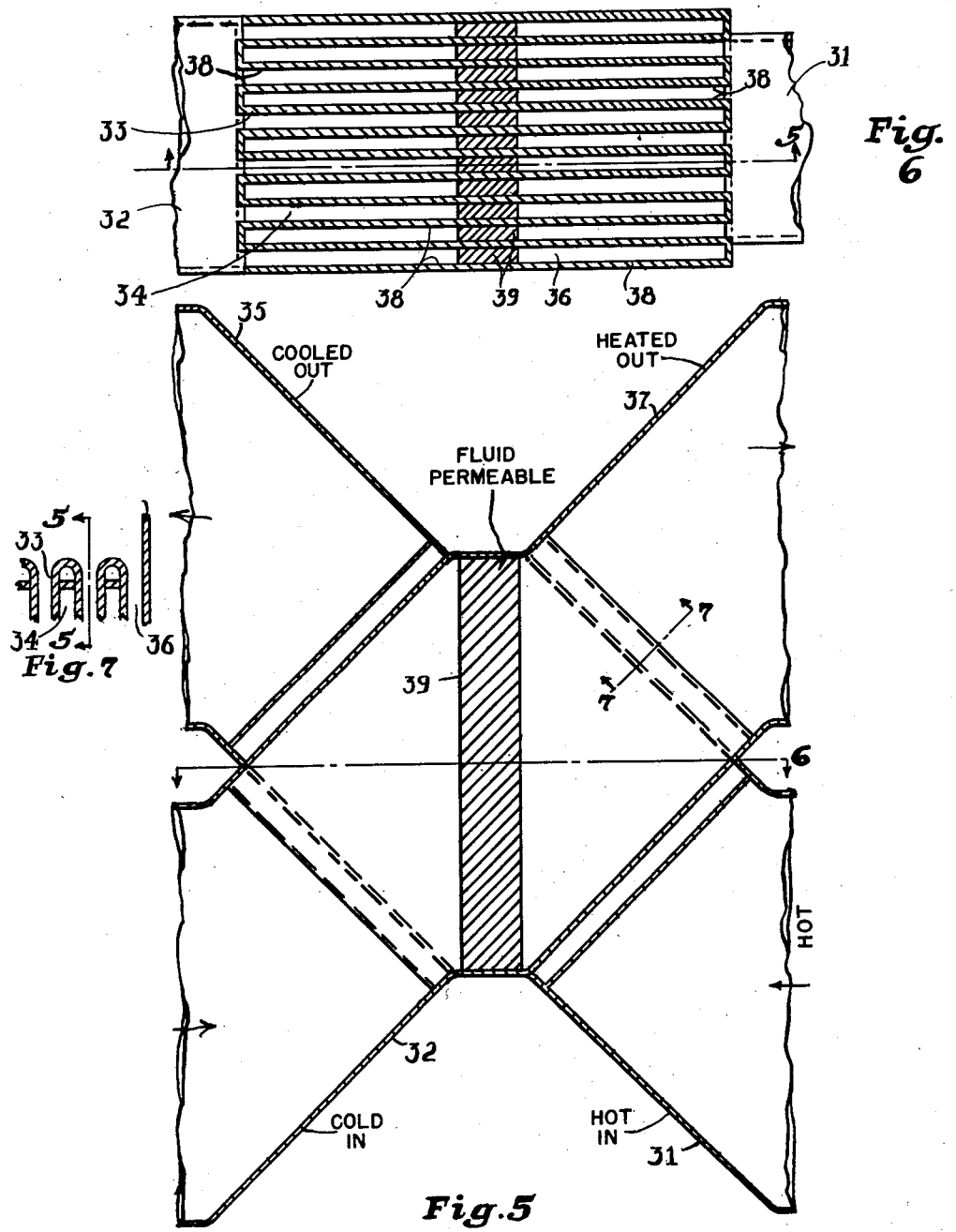
Inventor
Edward Adams Richardson
By Busser & Harding
Attorneys

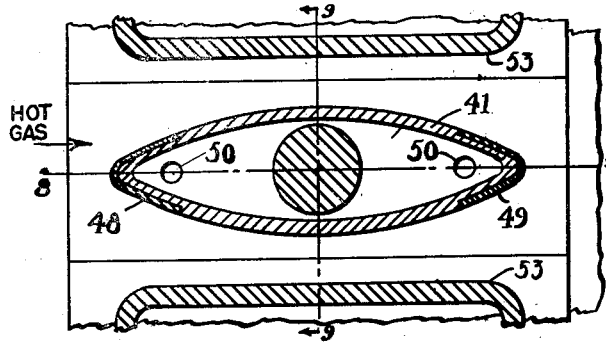
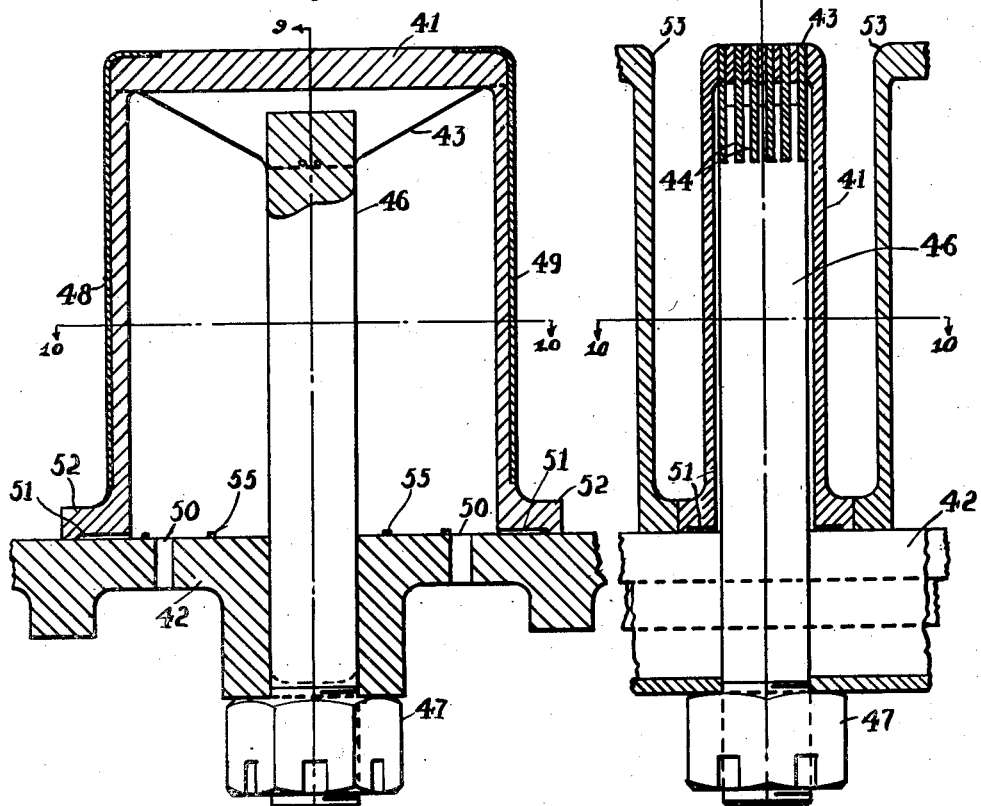

United States Patent Office 2,774,566
Patented Dec. 18, 1956

2,774,566

FLUID COOLED PERMEABLE TURBINE BLADE

Edward Adams Richardson, Bethlehem, Pa.

Application December 12, 1947, Serial No. 791,200

4 Claims. (Cl. 253—39.15)

This invention relates to the transfer of heat. More particularly it relates to a method and apparatus for the transfer of heat involving the use of material which is permeable to fluids.

The problem of reducing and controlling the temperature of certain structural parts such as bearings, cylinder walls, valves and gas turbine blades is constantly under attack. With the rapid increase in the use of gas turbines, jet and other types of engines involving the occurrence of very high temperatures, the need for greatly improved means of reducing the temperature of such structural parts has become imperative due to the effective temperature limits of known lubricants and the inability of many metals and alloys thereof to perform satisfactorily under the high temperatures required.

Further, in connection with gas turbines, the efforts to develop compact heat exchange apparatus for the interchange of heat between fluids required in interstage cooling has been largely unsuccessful due to the failure to overcome the inefficiency inherent in known types of heat interchangers.

The inability to adequately control the temperature of gas turbine vanes, bearings and other parts has limited the cycle of temperature to between 1200 and 1500 degrees Fahrenheit. Much higher cycle temperatures are desirable for greater efficiency.

It is, therefore, an object of this invention to provide a method and apparatus whereby achievement of efficient cooling and temperature control of material parts subjected to heat and in particular high heat is possible.

A further object of this invention is to provide more efficient means for the exchange of heat between two fluids.

An additional object of this invention is to provide means for cooling structural parts which are subjected to heavy loads.

An additional object of this invention is to provide means for cooling structures subjected to hot gases and means for preventing said hot gases from coming into contact with such structures.

These and other objects will become apparent from the description.

Briefly the present invention involves the use of fluid permeable materials having good thermal conductivity in conjunction with a fluid. The permeable materials act to conduct heat from a hot structural part, to transfer the heat to a cooling fluid and in some measure also to a colder surrounding structure. It is generally applicable to the controlled cooling of structural parts which support a heavy load since the permeable material is such that it can contribute to the overall structural strength.

The invention further embraces the use of the cooling fluid passing through the permeable body to form an outward flowing boundary of cool fluid between the permeable metal and a heating medium such as, for example, a hot gas.

Obviously if a body is having its outer surface maintained at a temperature of 500° Fahrenheit in a gas stream having a temperature, say, 1800° F., the temperature of the fluid permeating through the permeable body and arriving at the outer surface thereof must be very close to the 500° F. temperature. The shearing effect of the gas stream tends to draw out the permeating gas into a thin film. But the cool fluid coming out from the forward end of the body (that first met by the hot gas stream) tends to ride up on the fluid coming from further back, so there is a certain small tendency for the permeating fluid to have a slight but definite outwards velocity component. It is well known that any body past which a fluid moves tends to have a potential type of flow at some distance from the body, a laminar film of small thickness at the surface of the body, and a transition layers in between. In this case, the laminar film is continually being replaced by cool fluid, its slight outward component of motion is continually pushing back the hot gases, and the time available for heat flow to penetrate the thin film is small, since, particularly in turbine blades, the width parallel to the direction of gas motion is very small. For example, a blade 2.4 inches wide (0.20 foot) in a stream of gas having a velocity of 400 feet per second is passed by an elementary portion of gas stream in 0.0005 second, an interval of time very short for even a small amount of heat to pass through a self-replacing boundary layer of, say, air. This may be better appreciated if we consider the film stationary, subjected on its outer surface instantaneously to a temperature of 1800° F. while its uniform temperature initially is 500° F., and consider how much the inner surface may increase in temperature in 0.0005 second. This for the heat by conduction only. It is easy to show that at a depth of 0.005 centimeter in the air boundary layer, in 0.0005 second, the temperature could rise only 5 percent. of the difference betwen the 500° F. and the 1500° F., hence the thin air layer, even if stationary, during the 0.0005 second, would protect the surface from an appreciable temperature rise. The interposition of a thin boundary layer of initially cool fluid, introduced through small holes and allowed to spread therefrom in the direction of gas flow to form a fluid film stationary with respect to outwards motion from the surface away from said holes, is old in the art. The method involving introducing a relatively cool fluid through a permeable surface to produce a boundary layer moving with respect to motion away from the surface, is new. Whereas the old method would result in virtually full heat flow through the film at some distance from the point of fluid introduction, the new method avoids such a possibility no matter how extended the surface in the direction of hot gas flow. Actually the air is constantly being replaced and has a slight outwards velocity, so that the effect is greater than in the case of a stationary film.

An important aspect of the invention is the use of permeable bodies having large surface areas per unit of volume or mass which the fluid used may contact combined with a relatively low permeability. Such a body is readily formed by the use of fine mesh particles and closely approaches the desideratum of having all of the fluid being in substantial contact with the solid, the distances for heat flow being made extremely short through the thinness of the individual fluid streams passing through the permeable body.

Whereas most heat exchangers depend upon turbulent flow in which the pressure drop increases nearly as the square of the mass rate of flow, the use of permeable bodies results in a fluid flow which is substantially laminar so that the pressure drop is substantially as the first power of the fluid mass flowing. In general, less power is required for securing the transfer of heat because of this law, while the characteristic curve of power required is more favorable for operation and control.

It will be apparent that wide variations of permeabilities will be used in the embodiments of this invention due to having to compromise at times with other factors such as relative uniformity and rate of flow, strength of material, the ability to pick up heat from another body, and the object to be attained. Generally speaking, permeability is measured in terms of the number of cubic feet of air of an assigned initial temperature such as 70° F. flowing in one hour through each superficial square foot of surface when the pressure drop of the air is one foot of water pressure per foot of permeable body thickness. Such permeabilities may be at least as great as 14 for heat transfer devices to as low as, or even much lower than 0.006 for such fabrications as gas turbine blades.

Where a permeable body is used for maintaining one temperature on a cold surface and another temperature on a hot surface, the following formula is characteristic:

$$G.h = \int_{T_c}^{T_h} \frac{K}{Q} \cdot dT$$

where $$Q = \int_{T_F}^{T} C_v \cdot dt$$

G is rate of fluid flow;
$h$ is the thickness of the permeable material;
$T_h$ is the hot surface temperature;
$T_c$ is the cold surface temperature;
K is the conductivity of the solid and contained fluid. In general the solid free of fluid, and the fluid alone as though stationary, are considered to conduct in parallel in determining K at any point.
T is any inner temperature at a distance from the hot surface;
$T_F$ is the temperature of the entering fluid;
$C_p$ is the thermal capacity of the entering fluid.

This formula assumes a not too high rate of flow and a permeability such that the difference of temperature, at the distance $x$, between solid and fluid is of the order of a small fraction of a degree Fahrenheit.

In the design of a particular cooling structure, other factors must be considered. The required strength of the structure, the available pumping pressure, the available space and other factors depending on the specific problem are all involved.

Fluid permeable bodies of non-metallic substances suitable for use within the scope of this invention are well known in the art. Examples are bodies formed by bonding variously particles of graphite, Carborundum or quartz. Although developed comparatively recently, the manufacture of permeable metal bodies suitable for use in this invention is equally well known. Such bodies are used particularly in the production of filters and clutch plates.

In the production of filters a sintered powdered compact of bronze is commonly used. With a bronze compact, compressive strengths up to 16,000 pounds per square inch may be obtained. A wide range of permeabilities may be obtained by control of the mesh size of the metal particles. Since temperature as high as about 350° F. in an oxygen atmosphere and 900° F. in an atmosphere without oxygen may be applied to copper alloys without progressive building up of oxide and destruction of the permeable bodies, it will be apparent that permeable bodies such as those used in the filter art are well adapted to being used in this invention.

Variously by the use of different alloys, mixtures of principal alloy particles and bonding alloy particles such as copper, heat treatment and greater compaction pressures other even stronger permeable structures have been obtained. Thus an 0.87 percent carbon iron powder and copper bond powder has been pressed, sintered, repressed and resintered to give a body having a compressive strength of 85,000 pounds per square inch. Heat treating this compact results in a compressive strength of 150,000 pounds per square inch.

Infiltrant alloys in sintered compacts may be, for example, aluminum bronze with a relatively high melting point, high resistance to oxidation up to about 1000° Fahrenheit, and high strength, Everdur, beryllium-copper, copper-nickel, also copper-nickel-zinc alloys. The copper-nickel alloys are self-protecting against oxidation to 700° Fahrenheit; in addition, many have good resistance to creep up to moderately high temperatures. Even coin and sterling silver as well as gold alloys are valuable where chemical action must be resisted up to perhaps as high as 400° to 600° Fahrenheit. Titanium hydride has been used in compacts to secure a protective alloy surface on the base powder used in the compact. These are but a few of the materials readily available for metal bonding and surface protection.

The control of permeability is secured largely through particle size control and to a less extent through compaction under pressure and the degree of heating during sintering. Final control may be had by passing weak solutions, having a slight solvent action on the compact material, through said compacts to secure the desired permeability within close limits, when the sintered permeability is on the low side. Similarly a weak solution able to deposit metal or non-metallic filler, or colloidal body in the pores may be used to bring the permeability down from too high values. Chemical or electrolytic deposition is possible. Such methods may be used for other purposes such as producing a chemically resistant plate or the establishment of a catalytic material in the pores of the permeable body.

Reference may be made to the following for additional information on fluid permeable materials:

"Design of Powdered Metal Parts" by W. H. Arata in "Product Engineering," vol. XV, No. 8, August 1944, published by McGraw-Hill Publishing Company, Inc., 330 W. 42nd Street, New York 18, New York.

"Improved Engineering Properties of Parts Made from Iron Powders" by Claus G. Goetzel in "Product Engineering," vol. 18, No. 8, August 1947, published by McGraw-Hill Publishing Company, Inc., 330 W. 42nd Street, New York 18, New York.

"Powder Metallurgy, a Symposium" edited by John Wulff, published by The American Society for Metals, Cleveland, Ohio, 1942.

Other forms of permeable material may be utilized equally well in many applications of the invention provided the permeability is relatively low, the heat conductivity is good and the surface of elements per unit of volume is relatively large. Bodies formed of wire-like or needle-like particles with their axes substantially parallel to each other and to the heat flow and normal to the direction of fluid flow may be used in heat exchangers. In some cases it is practical to use sheet elements having permeability secured by scratching one side of each sheet so that the scratches of one sheet and the relatively smooth surface of an adjacent sheet shall produce the necessary fine passages on bonding the sheets. In general, all bodies used should have reasonably high inherent strength.

It will be apparent that there exists a wide selection of known materials which may be used in this invention. The qualities of strength, ability to stand up under high heat, permeability and heat conductivity may obviously be combined in an infinite number of combinations depending on the characteristics required.

A wide range of fluids may be used in connection with the permeable material. Air and other gases, air or other gas carrying a fog of liquid particles in suspension such as water droplets and water are examples. In most cases the fluids should be properly cleaned so as not to clog the pores through deposition of suspended solids, precipitants or the like. Where fluids may generate solid cracking products, as on heating, such fluids should be avoided or adequate means for cleaning the permeable body at regular intervals should be provided. Preferably they will be non-corrosive and will not dissolve the permeable material.

For some purposes, a gas such as air into which a heavy fog of liquid particles has been introduced will have valuable properties in respect to average density and more particularly heat capacity involving therein the heat absorption on evaporation of the liquid drops.

In the drawings:

Figure 5 is a vertical cross section of a heat exchanger;

Figure 6 is a section taken on a plane indicated at 6—6 in Figure 5;

Figure 7 is a section taken on a plane indicated at 7—7 in Figure 5;

Figure 8 is a vertical longitudinal section of a gas turbine vane;

Figure 9 is a section taken on a plane indicated at 9—9 in Figure 10; and

Figure 10 is a horizontal section of the gas turbine vane taken on line 10—10 of Fig. 8.

Figure 1:
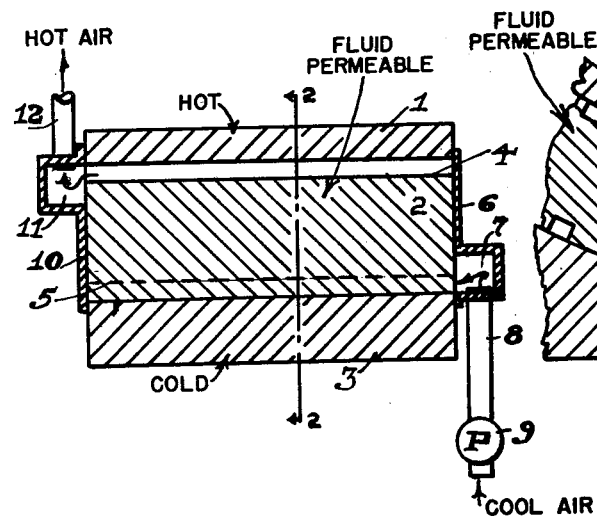
Figure 1 is a vertical cross section of a portion of a bearing and its supporting members.
Figure 2:
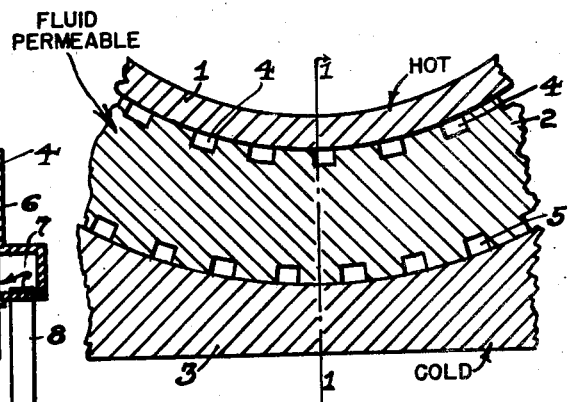
Figure 2 is a section taken on a plane indicated at 2—2 in Figure 1.

In Figures 1 and 2 a bearing 1 is supported by a member 2 which in turn is supported by a member 3. The member 2 is constructed of a fluid permeable metal having good thermal conductivity and has transverse grooves 4 in its inner face and transverse grooves 5 in its outer face.

A pump 9 through pipe 8 supplies a cool fluid, for example, air, under pressure to a chamber 7 into which the grooves 5 open. A plate 10 abuts against the members 2 and 3 and seals the other ends of the grooves 5. Thus the cool fluid is confined within the grooves 5 except to the extent it can flow through the permeable member 2 into the grooves 4.

One end of each of the grooves 4 is sealed by a plate 6 which abuts against the bearing 1 which may be, for example, bronze, and the permeable member 2. The other ends of the grooves 4 open into a chamber 11 which has an outlet pipe 12. Thus the fluid on reaching the grooves 4 will flow to chamber 11 and be exhausted through the pipe 12.

The member 2 having good thermal conductivity and being in surface to surface contact with the outer surface of bearing 1 will provide for a ready transfer of heat from the bearing to itself. Being permeable, it obviously has a vast heat transfer surface per unit of volume. Further, the air which is forced through the permeable member is broken down into innumerable streams, minute in magnitude. We, therefore, have the heat of the bearing transferred to surfaces very great in sum where it is transferred to minute streams of air. Thus it will be apparent that very efficient use of space and volume of fluid is achieved. The large amount of heat removed lowers the temperature of bearing 1, as well as that of the lubricating film in contact therewith, to values suited to said lubricant being used. Obviously the permeability required and the air flow will be adapted to securing this result.

Some heat will also be transferred from the bearing to the supporting member 3 (though this heat flow becomes negligible at even moderate rates of fluid flow) through the permeable member 2 and also to the air as it flows over the surface of the bearing when it is in grooves 4 en route to chamber 7.

It will be apparent that the strength of material required to support the bearing, the temperature of the bearing without any cooling and the temperature at which it is desired to maintain it, are factors which govern the selection of the permeable material.

Figure 3:
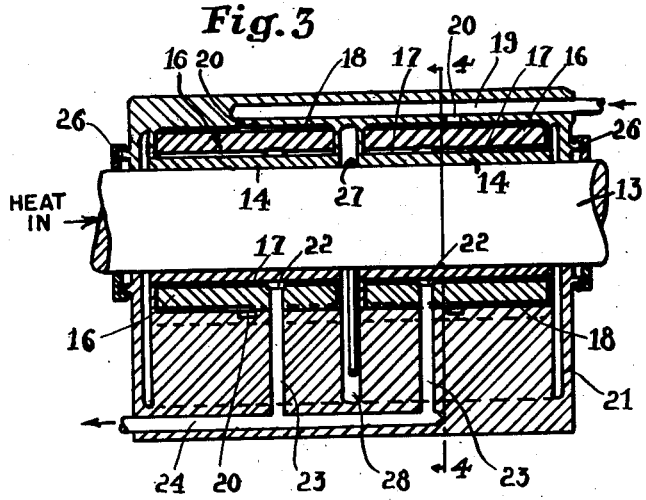
Figure 3 is a longitudinal vertical section of a ring oiler pillow block carrying a shaft.

In Figure 3, a bearing mounting 21 for use with a shaft subjected to high heat such as, for example, the shaft of an exhaust draft fan in a boiler plant is shown. A shaft 13 is surrounded by bearing shells 14 of bronze which are secured to a pillow block 15. Inserted in cut-out portions of the pillow block are permeable metal bands 16. Longitudinal grooves 17 are located in the faces of metal bands 16 which are adjacent the bearing shells 14. Similar grooves 18 are cut into the opposite faces of the metal bands.

A cooling fluid is pumped to chamber 19 and through the circumferential grooves 20 reaches grooves 18. Since the ends of grooves 18 abut against the pillow block, the fluid must pass through the permeable bands 16 to grooves 17 whose ends likewise abut against the pillow block. Circumferential grooves 22 and connected passages 23 and 24 provide an exhaust path for the fluid from the grooves 17.

In the case of an exhaust draft fan, passage 24 may be connected to the low pressure side of said exhaust draft fan so that the difference between atmospheric and suction pressures may produce the desired fluid flow.

The bearing mounting in addition has conventional packing glands 26, an oiler ring 27 and an oil chamber 28. The high heat of shaft 13 is transferred to bearing shells 14 which, in turn, transfer it readily to the permeable bands 16. Obviously as the rate of heat removal from bearing 14 is increased, the temperature of 13, 14, and all other parts is lowered so that at an appropriate rate of fluid flow, the desired temperature in bearing 14 is attained. As in the previous illustration, the heat in these bands is very efficiently transferred to the cooling fluid.

A modification of the embodiment of this invention is shown in Figures 5, 6 and 7. Here the invention is applied to the problem of transferring heat from one fluid to another fluid.

Conduit 31 supplies a hot fluid and conduit 32 a cold fluid. Partition member 33 which is made of metal of high heat conductivity forms alternate passages 36 for the hot fluid between conduit 31 and conduit 35 and alternate passages 34 for the cold fluid between conduit 32 and conduit 37. In each passage thus formed, a body 39 of fluid permeable metal of high heat conductivity is located. These bodies are well bonded to the adjacent walls 38 of partition member 33. All the fluids flowing within this system must pass through one of these permeable bodies.

The hot fluid flows from conduit 31 into passage 36 where it transfers some heat to the walls 38 of the passages. It then must pass through the permeable bodies 39 to which it will transfer a very large amount of heat. It will then pass out through the remainder of passages 36 to conduit 35.

The heat transferred to each body 39 in passages 36 will be readily transferred through the walls to which each body is bonded to the permeable bodies in the adjacent passages 34 in which the cooler fluid flows. Thus the cold fluid passes from conduit 32 to passages 34 where it passes through the now heated bodies 39. Heat is transferred from these heated bodies 39 to the cold fluid. The fluid thus heated passes out through conduit 37. There is, of course, some heat exchange also directly through the walls 38.

In Figures 8, 9 and 10, the embodiment of this invention in a gas turbine blade is represented. A blade 41 made of fluid permeable material is shown on a gas turbine rotor 42. Metal ribs 43 integral with the top of the blade 41 are secured in cut-out portions 44 in the head of bolt 46. Bolt 46 through ribs 43 places the blade under compression when locknut 47 is tightened. Since permeable metals are not as strong under tension as they are under compression, it is desirable to have the blade placed under initial compression to resist the tension induced by centrifugal force.

A nose piece 48 and a tail piece 49 both made of fluid impermeable material capable of resisting high heat are secured to the blade. A cool fluid under pressure flows through passages 50 in the rotor to the interior surfaces of the blade. Passages 55 connect the chamber 51 under flanges 52 with the interior of the blade. The members 53 are adjacent portions of the turbine.

In this embodiment, the cooling fluid passes through the permeable metal and into the stream of hot gases. In passing through the permeable metal the fluid performs its cooling function in the manner outlined in the previous examples. When it exhausts into the stream of hot gases, it performs an additional function. As it passes beyond the exterior surface of the blade, the fluid forms a protective layer always moving away from the surface of the blade and located between the blade and the hot gases thus preventing the hot gases from coming into contact with a large portion of the exterior surface of the blade. Since the only convection in this protective layer of fluid is outwards away from the surface of the blade, the only important way that heat can be transferred from the gases to the permeable metal is by radiation which is only a small percentage of the radiation from a solid of equivalent extent and having the same temperature.

The nose piece 48 and the tail piece 49 make possible the use of lower pressures for the cooling fluid since they cover the area of high pressure exerted by the gases in the turbine. It is, of course, possible to omit the use of nose and tail pieces and obtain satisfactory results. However, less uniformity of flow of the cooling fluid results if they are not used unless the cooling fluid is supplied at variant pressures. Thus uniform flow may be obtained by compartmenting the interior of the blade and having fluid at high pressure supplied to the nose and tail areas and fluid at progressively decreasing pressure as the compartments approach the center of the blade. It is obvious that permeable body 41 could be provided with grooves under nose piece 48 and tail piece 49, which passages are permitted to discharge in the low pressure region between 48 and 49 into the hot gas stream, whereby both 48 and 49 could be cooled in the manner shown very generally in Fig. 1.

It should be noted, of course, that applicant is not limited to the embodiments illustrated and described, it being apparent that numerous other embodiments of the invention are possible. Thus, for example, the invention could readily be applied to cooling clutch plates in a manner similar to the means of cooling the bearing shown in Figures 1 and 2. Similarly, a permeable metal could be used to make the clutch plate itself and a cooling fluid passed through the permeable metal. A further example of an embodiment falling within the scope of this invention is a heat exchanger similar to that shown in Figures 5, 6 and 7 adapted to carry out catalytic chemical reactions. In such an embodiment a suitable finely divided catalytic material adapted to the process being carried out may be deposited in the pores of the permeable material in the heat exchanger passages which are carrying the materials being reacted, while the alternate adjacent passages are carrying a fluid. Such fluid will supply the required heat for the carrying on of an endothermic reaction, or will be adapted to remove the heat generated in an exothermic reaction, the temperature of fluid supplied and the rate of supply being adapted to maintaining within the reaction zone the desired reaction temperature within narrow limits. In such a case, if a permeable metal is used, it might be necessary to first deposit in the pores a thin layer of corrosion resistance material such as, for example, silicate. Permeable material such as, for example, carbon or silica would be suitable.

Thus, it will be apparent that applicant should, in no manner, be limited to the illustrative embodiments illustrated and described.

Figure 4:
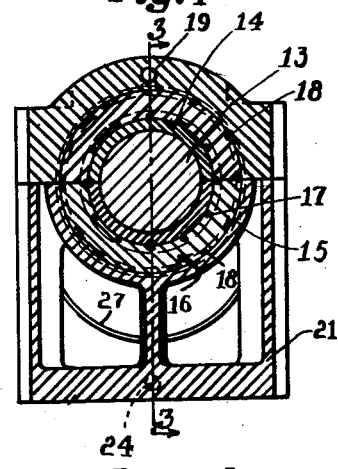
Figure 4 is a section taken on a plane indicated at 4—4 in Figure 3.

In view of the methods described, it should be obvious that the cooling of engine cylinders, for example, would be substantially shown in Figs. 3 and 4 if shaft 13 is replaced with hot cylinder gases and the lubricating means are replaced and the channels thereof to the shaft are closed. Since both the permeability and the thickness of the permeable body may be locally modified, increased cooling may be attained readily at exhaust valve seats, cylinder heads, and other hot spots, a result not readily secured by other methods of cooling. The embodiment shown in Figs. 8, 9 and 10 may be applied to the insulation or cooling of furnace walls of jet motors and rockets, the expansion tubes of rockets and many other devices, in which case the means shown for the overcoming of large tensile stresses may be removed. Obviously a further advantage of this method of cooling is securable in the case of engine cylinders and other pressure vessels in that the permeable body may be separated from the heat source by a shell, such as the shell 1 of Figs. 1 and 2 barely thick enough to take the wear and corrosion expected and allow a small amount for the bridging of the widths of channels such as the channels 4 of Figs. 1 and 2, with safety. Virtually the whole hoop strength can be placed in thin walls such as member 3 which are at substantially constant temperature differing little from atmospheric throughout the length and thickness thereof.

In view of the methods described, it should be obvious how the methods for protecting an exterior surface from heated gases may be applied for the protection of a furnace interior or the like from such gases, since in Fig. 10 bodies 41 and 53, which may be of identical construction, serve between them to confine a flow of hot gases to the interior surface formed between them.

What I claim and desire to protect by Letters Patent is:

1. In a turbine, a rotor, a hollow permeable metal blade, spaced metal ribs depending from the outer end of said blade remote from the rotor and into the interior of the blade, bolt means secured to said ribs and to said rotor whereby the blade may be placed under initial compression, a source of gaseous cooling fluid and means to conduct said cooling fluid into the interior of the hollow blade, said fluid flowing around said bolt and through the permeable blade.

2. The structure in accordance with claim 1, characterized in that the turbine blade has a permeability within the range of from 0.006 to 14 at 70° F.

3. In combination a hollow permeable turbine blade having a surface exposed to a heated atmosphere, a sheathing of non-permeable material on a portion of said surface, a source of gaseous cooling fluid under pressure, means to conduct said fluid into the interior of the blade, said fluid flowing through the permeable body towards the surface exposed to the heated atmosphere, the non-permeable sheath preventing flow of the heated atmosphere through that portion of the exposed surface covered thereby.

4. The structure in accordance with claim 3, characterized in that the turbine blade has a permeability within the range of from 0.006 to 14 at 70° F.

References Cited in the file of this patent

UNITED STATES PATENTS

| | | |
|---|---|---|
| 730,363 | Geisenhoner | June 9, 1903 |
| 1,835,971 | Schattanek | Dec. 8, 1931 |
| 1,893,330 | Jones | Jan. 3, 1933 |
| 2,149,510 | Darriens | Mar. 7, 1939 |
| 2,183,313 | Goddard | Dec. 12, 1939 |
| 2,304,259 | Karrer | Dec. 8, 1942 |
| 2,354,151 | Skoglund | July 18, 1944 |
| 2,361,854 | McCormack | Oct. 31, 1944 |
| 2,401,797 | Rasmussen | June 11, 1946 |
| 2,440,069 | Bloomberg | Apr. 20, 1948 |
| 2,489,683 | Stalker | Nov. 29, 1949 |
| 2,501,038 | Fransson | Mar. 21, 1950 |

FOREIGN PATENTS

| | | |
|---|---|---|
| 357,036 | Great Britain | Sept. 17, 1931 |
| 651,026 | France | Oct. 2, 1928 |